(12) United States Patent
Fujii et al.

(10) Patent No.: US 9,688,847 B2
(45) Date of Patent: Jun. 27, 2017

(54) POLYOLEFIN COMPOSITION, ORIENTED POLYOLEFIN FILM, AND PRODUCTION METHOD FOR SAME

(71) Applicant: IDEMITSU KOSAN CO., LTD., Chiyoda-ku (JP)

(72) Inventors: Nozomu Fujii, Sumida-ku (JP); Masahiro Kubo, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/031,212

(22) PCT Filed: Oct. 29, 2014

(86) PCT No.: PCT/JP2014/078800
§ 371 (c)(1),
(2) Date: Apr. 21, 2016

(87) PCT Pub. No.: WO2015/064653
PCT Pub. Date: May 7, 2015

(65) Prior Publication Data
US 2016/0237268 A1  Aug. 18, 2016

(30) Foreign Application Priority Data

Oct. 31, 2013  (JP) ................................. 2013-226941
Sep. 16, 2014  (JP) ................................. 2014-188270

(51) Int. Cl.
| | | |
|---|---|---|
| *C08L 23/10* | (2006.01) | |
| *C08J 5/18* | (2006.01) | |
| *B29C 35/02* | (2006.01) | |
| *B29C 55/00* | (2006.01) | |
| *B29C 55/02* | (2006.01) | |
| *B29C 55/14* | (2006.01) | |
| *B29C 55/16* | (2006.01) | |
| *B29C 55/12* | (2006.01) | |
| *B29C 47/00* | (2006.01) | |
| *B29K 23/00* | (2006.01) | |
| *B29K 105/00* | (2006.01) | |
| *B29L 7/00* | (2006.01) | |
| *B29L 9/00* | (2006.01) | |

(52) U.S. Cl.
CPC .............. *C08L 23/10* (2013.01); *B29C 35/02* (2013.01); *B29C 55/005* (2013.01); *B29C 55/023* (2013.01); *B29C 55/143* (2013.01); *B29C 55/16* (2013.01); *C08J 5/18* (2013.01); B29C 47/0004 (2013.01); B29C 47/0021 (2013.01); B29C 47/0057 (2013.01); B29C 55/12 (2013.01); B29K 2023/10 (2013.01); B29K 2105/0088 (2013.01); B29K 2105/256 (2013.01); B29K 2995/003 (2013.01); B29K 2995/0046 (2013.01); B29K 2995/0077 (2013.01); B29L 2007/008 (2013.01); B29L 2009/00 (2013.01); C08J 2323/10 (2013.01)

(58) Field of Classification Search
CPC ....... C08L 23/10; B29C 35/02; B29C 55/005; B29C 55/143; B29C 55/16; B29C 47/004; B29C 47/0021; B29C 47/0057; B29C 55/12; C08J 5/18; C08J 2323/10; B29K 2023/10; B29K 2105/0088; B29K 2105/256; B29K 2995/003; B29K 2995/0046; B29K 2995/0077; B29L 2007/008; B29L 2009/00
See application file for complete search history.

(56) References Cited

U.S. PATENT DOCUMENTS

| | | | |
|---|---|---|---|
| 5,986,009 | A | 11/1999 | Thoen et al. |
| 6,037,417 | A | 3/2000 | Nguyen et al. |
| 2003/0055173 | A1 | 3/2003 | Obata et al. |
| 2003/0143415 | A1 | 7/2003 | Seta et al. |
| 2005/0043495 | A1 | 2/2005 | Minami et al. |
| 2007/0015877 | A1 | 1/2007 | Burkhardt et al. |

(Continued)

FOREIGN PATENT DOCUMENTS

| | | |
|---|---|---|
| JP | 3-4371 B2 | 1/1991 |
| JP | 7-171891 A | 7/1995 |
| JP | 8-73528 A | 3/1996 |

(Continued)

OTHER PUBLICATIONS

International Search Report issued Feb. 10, 2015, in PCT/JP2014/078800 filed Oct. 29, 2014.

*Primary Examiner* — Nathan M Nutter
(74) *Attorney, Agent, or Firm* — Oblon, McClelland, Maier & Neustadt, L.L.P.

(57) ABSTRACT

Disclosed is a polyolefin composition for stretched film including an olefin-based polymer (A) having a melting endotherm (ΔH-D), as obtained from a melting endothermic curve which is obtained under a measurement condition of holding a sample at −10° C. for 5 minutes in a nitrogen atmosphere and then increasing the temperature at a rate of 10° C./min with a differential scanning calorimeter (DSC), of 0 to 80 J/g; and an olefin-based polymer (B) having a melting endotherm (ΔH-D), as observed under the foregoing measurement condition, of more than 80 J/g, wherein a content of the olefin-based polymer (A) is 0.5% by mass or more and less than 17% by mass relative to a total content of the olefin-based polymer (A) and the olefin-based polymer (B), and the polyolefin composition has a melting endotherm (ΔH-D), as observed under the foregoing measurement condition, of 80 to 120 J/g.

11 Claims, 1 Drawing Sheet

(56) References Cited

U.S. PATENT DOCUMENTS

2012/0208422 A1* 8/2012 Koori et al. .......... C08L 23/10
442/364
2012/0302982 A1 11/2012 Takebe et al.

FOREIGN PATENT DOCUMENTS

| | | |
|---|---|---|
| JP | 2000-281723 A | 10/2000 |
| JP | 2002-47358 A | 2/2002 |
| JP | 2002-503729 A | 2/2002 |
| JP | 2002-523544 A | 7/2002 |
| JP | 2002-348423 A | 12/2002 |
| JP | 2004-59652 A | 2/2004 |
| JP | 2005-126462 A | 5/2005 |
| JP | 2007-321084 A | 12/2007 |
| JP | 2009-501262 A | 1/2009 |
| JP | 2011-168944 A | 9/2011 |
| JP | 2014-205799 A | 10/2014 |
| WO | WO 2011/030893 A1 | 3/2011 |

* cited by examiner

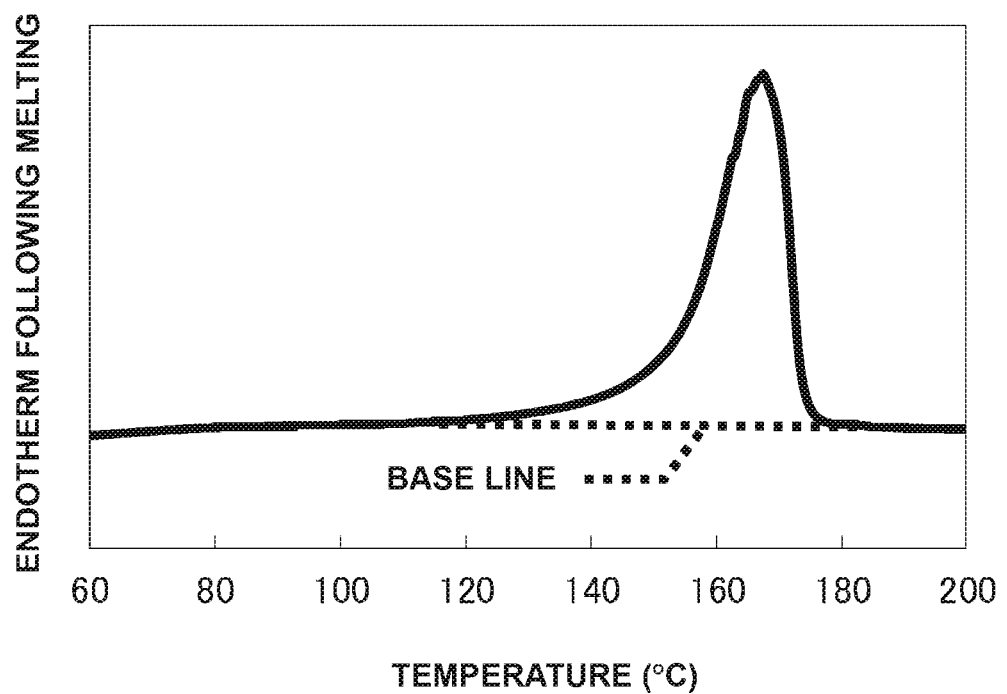

POLYOLEFIN COMPOSITION, ORIENTED POLYOLEFIN FILM, AND PRODUCTION METHOD FOR SAME

TECHNICAL FIELD

The present invention relates to a polyolefin composition, a polyolefin stretched film, and a method for producing the same.

BACKGROUND ART

Since polypropylene stretched films are inexpensive and excellent in transparency, surface gloss, heat resistance, and mechanical physical properties (for example, rigidity (so-called "nerve" of film), strength, and impact resistance), they are used for various packaging materials for a food application, an industrial application, or the like, electric materials, such as condensers or capacitors, etc., and the like, and their demands are rapidly increasing. As a general production method of such a polypropylene stretched film, there are exemplified a simultaneous biaxial stretching method by a tubular mode, a sequential biaxial stretching method (tenter mode) using a heating roll and a tenter, and the like. Furthermore, in the tenter mode, the stretching is carried out usually in a stretch ratio of a machine direction (MD: machine direction, also referred to as "flow direction") of the film and a direction (TD: transverse direction, also referred to as "lateral direction") perpendicular to the machine direction of 5 to 12 times. In addition, at this time, it is general that the stretching is carried out usually at a stretch speed of 200 to 525 m/min.

At present, the development of a polypropylene stretched film which is thin and has high rigidity and transparency as compared with conventional stretched films is studied. However, in polypropylene raw materials which have been conventionally used, the aforementioned production condition is substantially a maximum critical condition, and there is a concern that under a more critical condition than this, breakage of the film is generated, so that the production cannot be stably achieved. In addition, from the viewpoint of improving the production efficiency, or the viewpoint of decreasing a total cost, as compared with the conventional method, it is demanded to inhibit a breakage frequency at the time of stretching or to use high-rigidity polypropylene as a raw material. However, according to conventional polypropylene raw materials, in order to respond to the aforementioned demand, there is a limit. In addition, even if the conventional polypropylene raw materials are stretched by force, there is also a concern that the quality of a final product is deteriorated.

As for a measure for improving stretchability of the film, there is exemplified an improvement of a base resin of the film material.

For example, PTL 1 discloses that a propylene homopolymer in which a melt index and a pentad fraction fall within specified ranges, and a relation between an isotactic index and a pentad fraction and a relation between a melting point and a melting enthalpy satisfy specified formulae, respectively exhibits good stretching. However, even if the propylene homopolymer in which a very restricted primary structure is prescribed is suitable for a specified application, there was also involved such an aspect that it is poor in versatility.

PTL 2 discloses that a propylene copolymer obtained by copolymerizing propylene with a small amount of ethylene exhibits good stretching. However, there was involved such a defect that by forming a copolymer having the aforementioned constitution, the heat resistance of the copolymer or the rigidity of the stretched film is lowered.

Meanwhile, there is also proposed a measure for improving the stretchability of a film by using a second component as an additive without changing a base resin of a film material.

For example, PTL 3 discloses that a composition, in which 100 parts by weight of a polypropylene homopolymer, whose stereoregularity of a boiling-heptane insoluble part thereof is 0.960 or more in terms of an isotactic pentad fraction required by $^{13}$C-NMR, is blended with 0.01 to 2.5 parts by weight of an esterified product of dipentaerythritol as a plasticizer, exhibits good stretching. However, the esterified product of dipentaerythritol encountered such a defect that on the occasion when a molten resin thereof comes out from a die, its volatile component contaminates the surroundings of an extruder, a molded film, and the like.

In addition, PTL 4 discloses that good stretching is exhibited by adding a small amount of amorphous polypropylene to crystalline polypropylene that is a base material. However, there was involved such a defect that as the amorphous polypropylene is added, though the stretchability becomes good, the heat resistance of the resulting blended product of polypropylene is lowered, and the rigidity of a film obtained by stretching is also lowered.

In addition, PTL 5 discloses a polypropylene resin composition formed of 1 to 20 wt % of a propylene.α-olefin random copolymer (A) that is a polymer obtained through random copolymerization of propylene and an α-olefin other than propylene and having 2 to 20 carbon atoms, the copolymer having a melting point range as measured by differential scanning calorimetry (DSC) of from 40 to 115° C. and having a content of the α-olefin other than propylene of 5 to 70 mol %, and 80 to 99 wt % of a polypropylene resin (B) and discloses that this polypropylene resin composition exhibits good stretching. However, there was involved such a defect that as the propylene.α-olefin random copolymer (A) is added, though the stretchability becomes good, the heat resistance of the resulting polypropylene resin composition is lowered, and the rigidity of a film obtained by stretching is also lowered. Meanwhile, when it is contemplated to maintain the aforementioned heat resistance or rigidity of the film, conversely, there was involved such a defect that a sufficient improving effect of stretchability in the polypropylene resin composition is not obtained.

CITATION LIST

Patent Literature

PTL 1: JP 8-73528 A
PTL 2: JP 3-4371 B
PTL 3: JP 7-171891 A
PTL 4: JP 2002-503729 A
PTL 5: JP 2004-59652 A

SUMMARY OF INVENTION

Technical Problem

Under the foregoing circumstances, the present invention has been made, and an object thereof is to provide a polypropylene resin composition, in which a stretchable temperature width thereof is expanded in a lower temperature range as compared with the conventional polypropylene raw materials, and which is excellent in mechanical properties and optical properties after stretching, a polypropylene stretched film, and a method for producing the same.

Solution to Problem

The present inventors made extensive and intensive investigations. As a result, it has been found that by blending a small amount of an olefin-based polymer (A) having a relatively low melting endotherm and having a specified structure in a polyolefin composition, the aforementioned object is achieved. The present invention has been accomplished on a basis of such a finding.

Specifically, the present invention provides the following inventions.

[1] A polyolefin composition for stretched film, containing an olefin-based polymer (A) having a melting endotherm (ΔH-D), as obtained from a melting endothermic curve which is obtained under a measurement condition of holding a sample at −10° C. for 5 minutes in a nitrogen atmosphere and then increasing the temperature at a rate of 10° C./min with a differential scanning calorimeter (DSC), of 0 to 80 J/g; and an olefin-based polymer (B) having a melting endotherm (ΔH-D), as observed under the foregoing measurement condition, of more than 80 J/g, wherein a content of the olefin-based polymer (A) is 0.5% by mass or more and less than 17% by mass relative to a total content of the olefin-based polymer (A) and the olefin-based polymer (B), and the polyolefin composition has a melting endotherm (ΔH-D), as observed under the foregoing measurement condition, of 80 to 120 J/g.

[2] The polyolefin composition for stretched film as set forth in the above [1], wherein the olefin-based polymer (B) is a propylene-based polymer.

[3] The polyolefin composition for stretched film as set forth in the above [1] or [2], wherein the olefin-based polymer (A) is a propylene-based polymer.

[4] The polyolefin composition for stretched film as set forth in any of the above [1] to [3], wherein the olefin-based polymer (A) is a propylene-based polymer satisfying the following (1) and (2):

(1) [mmmm] is 20 to 60 mol %, (2) A melting point (Tm-D), as defined as a peak top observed on the highest temperature side of a melting endothermic curve which is obtained under a measurement condition of holding a sample at −10° C. for 5 minutes in a nitrogen atmosphere and then increasing the temperature at a rate of 10° C./min with a differential scanning calorimeter (DSC), is from 0 to 120° C.

[5] The polyolefin composition for stretched film as set forth in the above [4], wherein the polyolefin-based polymer (A) further satisfies the following (3) and (4):

(3) [rrrr]/(1−[mmmm])≤0.1

(4) Molecular weight distribution (Mw/Mn)<4.0.

[6] The polyolefin composition for stretched film as set forth in the above [4] or [5], wherein the polyolefin-based polymer (A) further satisfies the following (5) and (6):

(5) [rmrm]>2.5 mol %

(6) [mm]×[rr]/[mr]$^2$≤2.0.

[7] The polyolefin composition for stretched film as set forth in any of the above [1] to [6], wherein the polyolefin composition for stretched film is a polypropylene composition for stretched film.

[8] A polyolefin stretched film including the polyolefin composition for stretched film as set forth in any of the above [1] to [7] in at least one layer and being oriented in at least one direction.

[9] A method for producing a polyolefin stretched film, which includes heating a sheet including one or more layers composed of the polyolefin composition for stretched film as set forth in any of the above [1] to [7] and simultaneously or sequentially stretching the sheet in a uniaxial direction or biaxial directions.

[10] The method for producing a polyolefin stretched film as set forth in the above [9], wherein the polyolefin stretched film is a polypropylene stretched film.

[11] A method for producing a stretched film, which includes continuously stretching a film composed of the polyolefin composition for stretched film as set forth in any of the above [1] to [7] in a machine direction (MD) and subsequently continuously stretching the film in a direction (TD) perpendicular to the machine direction.

Advantageous Effects of Invention

In accordance with the present invention, a polypropylene resin composition, in which a stretchable temperature width thereof is expanded in a lower temperature range as compared with the conventional polypropylene raw materials, and which is excellent in mechanical properties and optical properties after stretching, is provided. In addition, according to a polypropylene stretched film obtained by stretching this polypropylene resin composition and a production method of the same, even in the case of stretching in a temperature region lower than that in the conventional technique, the resulting film is excellent in mechanical properties (in particular, elastic modulus and breakage resistance) and optical properties (in particular, transparency and gloss) as compared with the conventional technique.

BRIEF DESCRIPTION OF DRAWING

FIG. 1 is a graph showing a relation between a melting endotherm and a temperature, as observed with a differential scanning calorimeter.

DESCRIPTION OF EMBODIMENTS

The present invention is hereunder described. It is to be noted that in the present specification, the term "xx to yy" regarding a description of numerical values is a term expressing its lower limit or more and its upper limit or less.

[Polyolefin Composition for Stretched Film]

The polyolefin composition for stretched film of the present invention is a polyolefin composition containing an olefin-based polymer (A) having a melting endotherm (ΔH-D), as obtained from a melting endothermic curve which is obtained under a measurement condition of holding a sample at −10° C. for 5 minutes in a nitrogen atmosphere and then increasing the temperature at a rate of 10° C./min with a differential scanning calorimeter (DSC), of 0 to 80 J/g; and an olefin-based polymer (B) having a melting endotherm (ΔH-D), as observed under the foregoing measurement condition, of more than 80 J/g, wherein a content of the olefin-based polymer (A) is 0.5% by mass or more and less than 17% by mass relative to a total content of the olefin-based polymer (A) and the olefin-based polymer (B), and the polyolefin composition has a melting endotherm (ΔH-D), as observed under the foregoing measurement condition, of 80 to 120 J/g.

It is to be noted that there may be the case where the "polyolefin composition for stretched film" of the present invention is hereinafter abbreviated as "polyolefin composition".

The melting endotherm (ΔH-D) of the polyolefin composition of the present invention is from 80 to 120 J/g, and preferably from 85 to 120 J/g from the viewpoints that stretchability and physical properties of the film after stretching are greatly improved.

In the polyolefin composition of the present invention, the olefin-based polymer (B) has only to have a melting endotherm (ΔH-D) of more than 80 J/g, and any material may be used as the polyolefin-based polymer (B) so long as the melting endotherm (ΔH-D) of the resulting polyolefin composition is 80 to 120 J/g according to the content and melting endotherm (ΔH-D) of the olefin-based polymer (A).

A measurement method of the melting endotherm (ΔH-D) of the polyolefin composition and the olefin-based polymer (B) is the same as a measurement method of the melting endotherm (ΔH-D) of the olefin-based polymer (A) and propylene-based polymer (A') as described later, and a description thereof is omitted here.

In view of the fact that not only the polyolefin composition of the present invention contains the olefin-based polymer (A) having a melting endotherm (ΔH-D) of 0 to 80 J/g, but also the melting endotherm (ΔH-D) of the polyolefin composition of the present invention is regulated to 80 to 120 J/g, a proportion of the amorphous component increases, and a yield stress when the polyolefin composition is stretched is lowered, and hence, the stretchability of the polyolefin composition is greatly improved.

In particular, from the viewpoint that the stretchability of the polyolefin composition is greatly improved, for the purpose of increasing the proportion of the amorphous component in the polyolefin composition, not only the olefin-based polymer (A) has the aforementioned melting endotherm (ΔH-D), but also the content of the olefin-based polymer (A) is 0.5% by mass or more and less than 17% by mass, more preferably 0.5% by mass or more and less than 15% by mass, and still more preferably 1% by mass or more and less than 10% by mass relative to a total content of the olefin-based polymer (A) and the olefin-based polymer (B).

In the polyolefin composition for stretched film of the present invention, in the case where the content of the olefin-based polymer (A) is 0.5% by mass or more and less than 17% by mass relative to the total content of the olefin-based polymer (A) and the olefin-based polymer (B), the stretchability is greatly improved without affecting the mechanical properties and optical properties of the film.

In particular, from the viewpoint that the stretchability is greatly improved without affecting the mechanical properties and optical properties of the film, in the case where the olefin-based polymer (A) has the aforementioned melting endotherm (ΔH-D) and has the properties as described later (in particular, the case where the olefin-based polymer (A) is a propylene-based polymer (A')), it is preferred that the content of this olefin-based polymer (A) is a content falling within the foregoing range.

In the present invention, it may be supposed that in particular, by using the olefin-based polymer (A) having the aforementioned melting endotherm (ΔH-D) and having the properties as described later (in particular, the propylene-based polymer (A')), it becomes possible to achieve granulation without any additional components as compared with amorphous atactic polypropylene not having a melting point, and the olefin-based polymer (A) is excellent in a point that it is possible to increase a content of a soft component in a pellet. The atactic polypropylene does not have stereoregularity, does not have a long isotactic chain linkage to be taken into a lamella, and is not taken into a lamellar component that is a main component. Thus, there is a possibility that the atactic polypropylene bleeds as a tacky component onto the film surface after stretching. On the other hand, the olefin-based polymer (A) having the aforementioned melting endotherm (ΔH-D) and having the properties as described later (in particular, the propylene-based polymer (A')) contains an extremely small amount of a long isotactic chain linkage to be taken into a lamella, and hence, it may be supposed that in view of the fact that a part of the olefin-based polymer (A) is taken into a lamellar component that is a main component, tack on the film surface after stretching is inhibited, and a balance between the stretchability and the film physical properties is excellent. Meanwhile, in a conventional propylene.α-olefin copolymer using a comonomer, such as ethylene, 1-butene, etc., in the case where a content of a constituent unit of the comonomer is high, the resulting copolymer is low in a melting point and soft; however, when added to a polypropylene resin composition as a main component, phase separation is generated, so that the film physical properties are remarkably impaired. On the other hand, there may be the case where by properly controlling the content of the constituent unit of the comonomer, the resulting copolymer becomes compatible with the polypropylene-based resin composition that is a main component. However, as compared with the aforementioned propylene.α-olefin copolymer, the olefin-based polymer (A) having the aforementioned melting endotherm (ΔH-D) and having the properties as described later (in particular, the propylene-based polymer (A')) is remarkably high in compatibility with the polypropylene-based resin composition that is a main component and most analogous thereto in terms of a primary structure, and hence, it may be supposed that extremely excellent characteristics even in optical properties are revealed.

In addition, the olefin-based polymer (A) having the aforementioned melting endotherm (ΔH-D) and having the properties as described later (in particular, the propylene-based polymer (A')) is high in a glass transition point as compared with the aforementioned propylene.α-olefin copolymer, and hence, when added to the polypropylene-based resin composition that is s a main component, the glass transition point does not decrease. When the glass transition point decreases, the storage modulus in a usual living temperature range (in the vicinity of from −10 to 40° C.) decreases, and hence, a molded article is felt to be soft. Thus, it may be supposed that the propylene-based polymer (A') has an effect for inhibiting the decrease of an elastic modulus in a living temperature range as compared with the aforementioned propylene.α-olefin copolymer.

In addition, the olefin-based polymer (A) having the aforementioned melting endotherm (ΔH-D) and having the properties as described later (in particular, the propylene-based polymer (A')) has such a characteristic that its rate of crystallization is slow as compared with the aforementioned propylene.α-olefin copolymer. This is originated from the fact that in the aforementioned propylene.α-olefin copolymer, the stereoregularity is high, and a rate of forming 3/1 helices necessary for crystallization is equal to that in a propylene polymer having high stereoregularity and not using a comonomer, whereas in the olefin-based polymer (A) having the aforementioned melting endotherm (ΔH-D), a disturbance of the stereoregularity is properly existent in the molecular chain, so that a rate of forming 3/1 helices necessary for crystallization is remarkably slow as compared with a propylene polymer having high stereoregularity and not using a comonomer. In the case of adding a material with a slow rate of crystallization to the polypropylene-based resin composition that is a main component, the rate of crystallization of the whole of the resin composition becomes slow, and it may be supposed that when the rate of crystallization of the whole of the resin composition becomes slows, a rate of growth of a spherulite becomes small, the growing spherulite size becomes small, and the fracture stress of spherulite at the time of stretching becomes small, and hence, uniform and easy stretching may be realized.

<Olefin-Based Polymer (A)>

The olefin-based polymer (A) of the present invention is preferably an olefin-based polymer obtained by polymerization of one or more monomers selected from ethylene and α-olefins having 3 to 28 carbon atoms.

Examples of the α-olefin having 3 to 28 carbon atoms include propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and the like. Among those, α-olefins having 3 to 24 carbon atoms are preferred; α-olefins having 3 to 12 carbon atoms are more preferred; α-olefins having 3 to 6 carbon atoms are still more preferred; α-olefins having 3 to 4 carbon atoms are especially preferred; and propylene is most preferred. An olefin-based polymer obtained by polymerization of one kind alone among those α-olefins may be used, and an olefin-based copolymer obtained by copolymerization of two or more kinds thereof may be used. It is to be noted that in the present invention, in the case of simply referring to "olefin-based polymer", an olefin-based copolymer is also included.

Examples of the olefin-based polymer include an ethylene-based polymer in which an ethylene monomer accounts for 50 mol % or more of monomers constituting the polymer; a propylene-based polymer (A') in which a propylene monomer accounts for 50 mol % or more of monomers constituting the polymer; a butene-based polymer in which a butene monomer accounts for 50 mol % or more of monomers constituting the polymer; and the like. Among those, a propylene-based polymer (A') is more preferred since excellent molded article physical properties in terms of rigidity and transparency, for example, film physical properties, can be exhibited.

The olefin-based polymer (A) of the present invention is a polymer to be added in a small amount to the polyolefin-based polymer (B). The olefin-based polymer (A) of the present embodiment is preferably a propylene-based polymer (A') which is selected from, for example, a propylene homopolymer, a propylene-ethylene block copolymer, a propylene-butene block copolymer, a propylene-α-olefin block copolymer, a propylene-ethylene random copolymer, a propylene-butene random copolymer, a propylene-α-olefin random copolymer, a propylene-α-olefin graft copolymer, and the like.

Furthermore, the propylene-based polymer (A') is preferably a polymer in which a propylene monomer accounts for 50 mol % or more of monomers constituting the olefin-based polymer (A), and the propylene-based polymer (A') may be a polymer satisfying the following (i) and/or (ii).

(i) A constituent unit of ethylene is contained in an amount of more than 0 mol % and 20 mol % or less.

(ii) A constituent unit of 1-butene is contained in an amount of more than 0 mol % and 30 mol % or less.

That is, in the polyolefin composition of the present invention, in the case where the olefin-based polymer (B) that is a main component is a propylene-based polymer (B'), from the viewpoint of compatibility with the propylene-based polymer (B') as a main component, in the case where the propylene-based polymer (A') is a copolymer containing an olefin having 2 carbon atoms (namely, an ethylene monomer), the content of a constituent unit of the olefin having 2 carbon atoms (hereinafter also referred to as "constituent unit of ethylene") is preferably more than 0 mol % and 20 mol % or less, more preferably more than 0 mol % and 18 mol % or less, still more preferably more than 0 mol % and 15 mol % or less, and especially preferably more than 0 mol % and 13 mol % or less. In the case of a copolymer containing an olefin having 3 carbon atoms, the content of a constituent unit of the olefin having 3 carbon atoms (namely, a propylene monomer) (hereinafter also referred to as "constituent unit of propylene") is preferably 50 mol % or more, more preferably 65 mol % or more, still more preferably 75 mol % or more, and yet still more preferably 80 mol % or more. In the case of a copolymer containing an α-olefin having 4 or more carbon atoms (namely, a 1-butene monomer), the content of a constituent unit of the α-olefin having 4 or more carbon atoms (hereinafter also referred to as "constituent unit of I-butene") is preferably more than 0 mol % and 30 mol % or less, more preferably more than 0 mol % and 27 mol % or less, and still more preferably more than 0 mol % and 5 mol % or less. In the polyolefin composition of the present invention, in the case where the olefin-based polymer (B) that is a main component is the propylene-based polymer (B'), from the viewpoint of compatibility with the propylene-based polymer (B') as a main component and the like, the olefin-based polymer (A) of the present invention is most preferably a propylene homopolymer. The aforementioned polymer may be a polymer using a petroleum- or coal-derived monomer, or may also be a polymer using a biomass-derived monomer.

[Melting Endotherm (ΔH-D)]

The melting endotherm (ΔH-D) of the olefin-based polymer (A) and the propylene-based polymer (A') is 0 to 80 J/g. In the case where the melting endotherm (ΔH-D) of the olefin-based polymer (A) and the propylene-based polymer (A') is 0 to 80 J/g, a degree of crystallization is decreased relative to the olefin-based polymer (B) that is a main component of the polyolefin composition for stretched film of the present invention (in particular, the case where the olefin-based polymer (B) is the propylene-based polymer (B')). According to this, the lamella-to-lamella tie molecular number decreases. When the tie molecular number is small at the time of stretching, since an initial higher-order structure is uniformly deformed, as a result, the uniform stretchability is improved. From such a viewpoint, the melting endotherm (ΔH-D) is 0 to 80 J/g, preferably 10 to 70 J/g, more preferably 20 to 60 J/g, and still more preferably 30 to 50 J/g.

It is to be noted that in the present invention, the melting endotherm (ΔH-D) is calculated from an area which is determined by holding 10 mg of a sample at −10° C. for 5 minutes in a nitrogen atmosphere and then increasing the temperature at a rate of 0° C./min with a differential scanning calorimeter (DSC-7, available from Perkin Elmer, Inc.), to obtain a melting endothermic curve, followed by surrounding by a line portion containing a peak of the melting endothermic curve and a line (base line) connecting a point on a low-temperature side where no change of the quantity of heat is present with a point on a high-temperature side where no change of the quantity of heat is present.

The olefin-based polymer (A) and the propylene-based polymer (A') of the present invention are a propylene-based polymer preferably satisfying at least one of the following (1) and (2), more preferably satisfying the following (3) and (4), and still more preferably satisfying the following (5) and (6).

(1) [mmmm] is 20 to 60 mol %.
(2) A melting point (Tm-D), as defined as a peak top of a peak observed on the highest temperature side of a melting endothermic curve which is obtained under a measurement condition of holding a sample at −10° C. for 5 minutes in a nitrogen atmosphere and then increasing the temperature at a rate of 10° C./min with a differential scanning calorimeter (DSC), is from 0 to 120° C.
(3) [rrrr]/(1−[mmmm])≤0.1
(4) Molecular weight distribution (Mw/Mn)<4.0
(5) [rmrm]>2.5 mol %
(6) [mm]×[rr]/[mr]$^2$≤2.0

(1) Meso Pentad Fraction [Mmmm]

The meso pentad fraction [mmmm] is an indicator showing the stereoregularity of the propylene-based polymer, and the larger the meso pentad fraction [mmmm], the higher the stereoregularity becomes.

In the case where the olefin-based polymer (A) is a propylene homopolymer, its meso pentad fraction [mmmm] is preferably 20 to 60 mol %, more preferably 30 to 55 mol %, and still more preferably 40 to 50 mol % from the viewpoints of handling properties of the propylene-based polymer and an improving effect of stretchability on the occasion of adding a small amount of the propylene-based polymer to the polyolefin-based polymer (B). When the meso pentad fraction [mmmm] is 20 mol % or more, the stretchability may be improved without lowering the rigidity of the olefin-based polymer (B) that is a main component of the polyolefin composition for stretched film of the present invention, whereas when it is 60 mol % or less, the propylene homopolymer does not form a eutectic crystal with the olefin-based polymer (B) that is a main component but is compatibilized with an amorphous portion of the olefin-based polymer (B) that is a main component, whereby the stretchability may be improved.

(2) Melting Point (Tm-D)

It is preferred that the melting point (Tm-D) of the olefin-based polymer (A) and the propylene-based polymer (A') is higher from the viewpoints of strength and moldability. The melting point (Tm-D) is preferably 0 to 120° C., more preferably 50 to 100° C., still more preferably 55 to 90° C., and yet still more preferably 60 to 80° C.

It is to be noted that a peak top of a peak observed on the highest temperature side of a melting endothermic curve obtained by holding 10 mg of a sample at −10° C. for 5 minutes in a nitrogen atmosphere and then increasing the temperature at a rate of 10° C./min with a differential scanning calorimeter (DSC-7, available from Perkin Elmer, Inc.) is defined as the melting point (Tm-D). It is possible to control the melting point by properly adjusting a monomer concentration or a reaction pressure.

(3) [rrrr]/(1−[mmmm])

A value of [rrrr]/(1−[mmmm]) is determined from a meso pentad fraction [mmmm] and a racemic pentad fraction [rrrr] and is an indicator showing the uniformity of the regularity distribution of polypropylene. When this value of [rrrr]/(1−[mmmm]) becomes large, the resultant becomes a mixture of polypropylene with high stereoregularity and atactic polypropylene as in the conventional polypropylene as produced using an existent catalyst system, leading to a cause of tack of the polypropylene stretched film after molding. A unit of each of the aforementioned [rrrr] and [mmmm] is mol %.

The value of [rrrr]/(1−[mmmm]) in the olefin-based polymer (A) and the propylene-based polymer (A') is preferably 0.1 or less, more preferably 0.001 to 0.05, still more preferably 0.001 to 0.04, and especially preferably 0.01 to 0.04 from the viewpoint of tack.

Here, the meso pentad fraction [mmmm], the racemic pentad fraction [rrrr], and a racemic-meso-racemic-meso pentad fraction [rmrm] as described later are determined in conformity with the method proposed in "Macromolecules, 6, 925 (1973)" by A. Zambelli, et al., and are a meso fraction, a racemic fraction, and a racemic-meso-racemic-meso fraction, respectively in a pentad unit in a polypropylene molecular chain measured with the signal of a methyl group in the $^{13}$C-NMR spectrum. As the meso pentad fraction [mmmm] increases, the stereoregularity increases. In addition, triad fractions [mm], [rr], and [mr] as described later are also calculated by the foregoing method.

(4) Molecular Weight Distribution (Mw/Mn)

A molecular weight distribution (Mw/Mn) of the olefin-based polymer (A) and the propylene-based polymer (A') is preferably less than 4 from the viewpoint of high strength. When the molecular weight distribution (Mw/Mn) is less than 4, a low-molecular weight component which adversely affects the stretchability or film physical properties (for example, mechanical properties and optical properties) is inhibited, and a lowering of the film physical properties of the polypropylene stretched film of the present invention as described later is inhibited. The molecular weight distribution (Mw/Mn) of the olefin-based polymer (A) and the propylene-based polymer (A') is preferably 3 or less, more preferably 2.5 or less, and still more preferably 1.5 to 2.5.

In the present invention, the molecular weight distribution (Mw/Mn) is a value calculated from a weight average molecular weight Mw and a number average molecular weight Mn as converted into polystyrene as measured by means of the gel permeation chromatography (GPC).

(5) Racemic-Meso-Racemic-Meso Pentad Fraction [rmrm]

The racemic-meso-racemic-meso pentad fraction [rmrm] is an indicator showing random properties of the stereoregularity of polypropylene, and as the value is larger, the random properties of polypropylene increase.

The racemic-meso-racemic-meso pentad fraction [rmrm] of the olefin-based polymer (A) and the propylene-based polymer (A') is preferably more than 2.5 mol %. In view of the fact that the racemic-meso-racemic-meso pentad fraction [rmrm] of the olefin-based polymer (A) and the propylene-based polymer (A') is more than 2.5 mol %, the random properties increase, and it is difficult to form a eutectic crystal with the olefin-based polymer (B) that is a main component of the polyolefin composition for stretched film of the present invention (in particular, the case where the olefin-based polymer (B) is a propylene-based polymer (B')). As a result, a lowering of the heat resistance or rigidity of the polyolefin composition is inhibited. From such a viewpoint, the racemic-meso-racemic-meso pentad fraction [rmrm] of the olefin-based polymer (A) and the propylene-based polymer (A') is preferably 2.6 mol % or more, and more preferably 2.7 mol % or more. In general, an upper limit thereof is preferably about 10 mol %, more preferably 7 mol %, still more preferably 5 mol %, and especially preferably 4 mol %.

(6) [mm]×[rr]/[mr]$^2$

A value of [mm]×[rr]/[mr]$^2$ which is calculated from the triad fractions [mm], [rr], and [mr] shows an indicator of random properties of the polymer. As the value of [mm]×[rr]/[mr]$^2$ is closer to 1, the random properties become high, and the formation of a eutectic crystal with the olefin-based polymer (B) that is a main component of the polyolefin composition for stretched film of the present invention (in particular, the case where the olefin-based polymer (B) is a propylene-based polymer (B')), so that the stretchability of the olefin-based polymer (B) that is a main component (in particular, the propylene-based polymer (B')) may be effectively improved. In the olefin-based polymer (A) and the propylene-based polymer (A') of the present invention, the value of the foregoing formula is generally in the range of 2 or less, preferably from 1.8 to 0.5, and more preferably from 1.5 to 0.5. A unit of each of the aforementioned [mm] and [rr] is mol %.

The propylene-based resin (A') may be produced by using a metallocene-based catalyst as described in, for example, WO 2003/087172A. In particular, a metallocene-based catalyst using a transition metal compound in which a ligand forms a crosslinked structure via a crosslinking group is preferred. Above all, a metallocene-based catalyst obtained by combining a transition metal compound in which a crosslinked structure is formed via two crosslinking group with a promoter is preferred.

Specifically, examples thereof include a polymerization catalyst containing (i) a transition metal compound represented by the following general formula (I) and (ii) a component selected from (ii-1) a compound capable of reacting with the transition metal compound that is the component (i) or a derivative thereof to form an ionic complex and (ii-2) an aluminoxane.

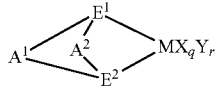
(I)

In the formula, M represents a metal element belonging to any one of the Groups 3 to 10 or the lanthanoid series in the periodic table; each of $E^1$ and $E^2$ represents a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and forms a crosslinked structure via $A^1$ and $A^2$, and may be the same as or different from each other; X represents a σ-bonding ligand, and when a plurality of Xs are present, the plurality of Xs may be the same as or different from each other, and each X may crosslink with any other X, $E^1$, $E^2$, or Y; Y represents a Lewis base, and when a plurality of Ys are present, the plurality of Ys may be the same as or different from each other, and each Y may crosslink with any other Y, $E^1$, $E^2$, or X; each of $A^1$ and $A^2$ represents a divalent crosslinking group that bonds two ligands and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —S, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a hydrocarbon group having 1 to 20 carbon atoms, or a halogen-containing hydrocarbon group having 1 to 20 carbon atoms, and may be the same as or different from each other; q represents an integer of 1 to 5 and corresponds to [(valence of M)−2]; and r represents an integer of 0 to 3.

The transition metal compound that is the component (i) is preferably a transition metal compound in which the ligand is of a (1,2')(2,1') double crosslinking type, and examples thereof include (1,2'-dimethylsilylene)(2,1'-dimethylsilylene)-bis(3-trimethylsilylmethylindenyl)zirconium dichloride.

As specific examples of the compound that is the component (ii-1), there can be exemplified triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl) phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrinmanganese tetrakis(pentafluorophenyl)borate, silver tetrafluoroborate, silver hexafluorophosphate, silver hexafluoroarsenate, sliver perchlorate, silver trifluoroacetate, silver trifluoromethanesulfonate, and the like.

Examples of the aluminoxane that is the component (ii-2) include known chain aluminoxanes and cyclic aluminoxanes.

In addition, the propylene-based polymer (A') may also be produced by jointly using an organoaluminum compound, such as trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride, etc.

<Olefin-Based Polymer (B)>

The olefin-based polymer (B) of the present invention is a main component of the polyolefin composition for stretched film of the present invention and is a base material resin of the polyolefin stretched film of the present invention as described later. The olefin-based polymer (B) of the present embodiment is not particularly limited so long as it is the olefin-based polymer (B) having a melting endotherm (ΔH-D), as obtained from a melting endothermic curve which is obtained by holding a sample at −10° C. for 5 minutes in a nitrogen atmosphere and then increasing the temperature at a rate of 10° C./min with a differential scanning calorimeter (DSC), of more than 80 J/g. Examples thereof include an ethylene-based polymer in which an ethylene monomer accounts for 50 mol % or more of monomers constituting the polymer; a propylene-based polymer in which a propylene monomer accounts for 50 mol % or more of monomers constituting the polymer; a butene-based polymer in which a butene monomer accounts for 50 mol % or more monomers constituting the polymer; and the like. Among those, a propylene-based polymer from which excellent film physical properties are obtained from the viewpoints of rigidity and transparency is preferred.

The propylene-based polymer is preferably the propylene-based polymer (B') selected from a propylene homopolymer, a propylene-ethylene block copolymer, a propylene-butene block copolymer, a propylene-α-olefin block copolymer, a propylene-ethylene random copolymer, a propylene-butene random copolymer, a propylene-α-olefin random copolymer, a propylene-α-olefin graft copolymer, and the like. Furthermore, from the viewpoint of physical properties (for example, mechanical properties and optical properties) of the polyolefin stretched film, the olefin-based polymer (B) of the present invention is especially preferably a propylene-ethylene random copolymer or a propylene homopolymer. The aforementioned polymer may be a polymer using a petroleum- or coal-derived monomer, or may also be a polymer using a biomass-derived monomer.

[Additives]

The polyolefin composition for stretched film of the present invention may be further blended with an antioxidant, a heat resistance stabilizer, a weatherability stabilizer, an antistatic agent, a slipping agent, an anti-blocking agent, a defogging agent, a lubricant, a nucleating agent, a petroleum resin, a hydrogenated petroleum resin, a dye, a pigment, a natural oil, a synthetic oil, a wax, a filler, an elastomer, or the like, as the need arises, within the range not imparting the object of the present invention.

As the antioxidant, a hindered phenol-based antioxidant, a sulfur-based antioxidant, a lactone-based antioxidant, an organic phosphite-based antioxidant, or an organic phosphonite-based antioxidant, or an antioxidant composed of a combination of plural kinds thereof, or the like may be used.

As the slipping agent, an amide of a saturated or unsaturated fatty acid, such as lauric acid, palmitic acid, oleic acid, stearic acid, erucic acid, hebenic acid, etc., or a bisamide of such a saturated or unsaturated fatty acid may be used. Among those, erucic amide and ethylenebisstearic amide are preferred. It is preferred to blend the slipping agent in an amount ranging from 0.01 to 5 parts by mass based on 100 parts by mass of the polyolefin composition.

Examples of the antiblocking agent may include finely powdered silica, finely powdered aluminum oxide, finely powdered clay, a powdered or liquid silicon resin, a polytetrafluoroethylene resin, and a finely powdered crosslinked resin, such as a crosslinked acrylic resin or methacrylic resin powder. Among those, finely powdered silica and a finely powdered crosslinked resin are preferred.

As the elastomer, a styrene-based elastomer, an olefin-based elastomer, an ester-based elastomer, a soft vinyl chloride-based elastomer, a urethane-based elastomer, an amide-based elastomer, or a butadiene-isoprene-based elastomer, or an elastomer composed of a combination of plural kinds thereof may be used. Among those, a styrene-based elastomer, an olefin-based elastomer, and a butadiene-isoprene-based elastomer are preferred. It is preferred to blend the elastomer in an amount ranging from 1 to 20 parts by mass based on 100 parts by mass of the polyolefin composition.

[Polyolefin Stretched Film]

The polyolefin stretched film of the present invention is a stretched film obtained by molding the polyolefin composition for stretched film of the present invention. Examples of the polyolefin stretched film include kinds, such as a polyethylene stretched film, a polypropylene stretched film, a polybutene stretched film, etc., and a polypropylene stretched film is preferred because it has excellent film physical properties.

The kind of the polyolefin stretched film is determined by the kind of the olefin-based polymer (B) that is a base material resin of the polyolefin stretched film and is also a main component of the polyolefin composition for stretched film.

[Multilayered Film Constituted of Polyolefin Stretched Film]

The polyolefin stretched film of the present invention includes at least one layer composed of the polyolefin composition for stretched film of the present invention and is a film prepared by orienting this layer in a uniaxial direction or biaxial directions. Furthermore, the polyolefin stretched film of the present invention may be formed into a multilayered film by laminating a polyolefin composition working as a sealant layer and a skin layer on a layer adjacent to the layer composed of the polyolefin composition for stretched film of the present invention.

Examples of the resin composition which is used for the sealant layer and the skin layer include, in addition to the polyolefin composition, a resin having gas barrier properties (e.g., an ethylene-vinyl alcohol copolymer, etc.) and a resin having rigidity (e.g., nylon, etc.). In addition, the innermost or outermost layer of the multilayered film may be provided with a thin film having gas barrier properties. Though a thickness of the polyolefin stretched film of the present invention is not particularly limited, it is generally 1 to 200 μm, preferably 1 to 80 μm, more preferably 1 to 50 μm, and still more preferably 1 to 30 μm.

Among the polyolefin stretched films of the present invention, as described later, the polypropylene stretched film is excellent in stretchability, mechanical properties, and optical properties as compared by the conventional polypropylene stretched film using a polypropylene raw material; and also, according to the polypropylene stretched film, not only it is possible to make the film thin and to make the production line speed high, but also the breakage frequency is reduced as compared with the conventional stretched films. In addition, by adding a material with low crystallinity, a torque is reduced, a mechanical load may be reduced, and also, it becomes possible to achieve high discharge.

[Production Method of Polyolefin Stretched Film]

The production method of a polyolefin stretched film of the present invention is a production method of reheating a sheet or film including one or more layers composed of the polyolefin composition for stretched film of the present invention and simultaneously or sequentially stretching the sheet or film in a uniaxial direction or biaxial directions, thereby obtaining a polyolefin stretched film.

As a general production method of the polyolefin stretched film of the present invention, an example thereof is hereunder described. The present invention should not be limited to the following production method.

The polyolefin composition for stretched film of the present invention is melt extruded and poured in a curtain state from a T-type die, and immediately thereafter, this molten film is solidified by a cooling roll, thereby obtaining a primary film or sheet. Subsequently, stretching is carried out by a succeeding stretching apparatus. A resin temperature at the time of melt extrusion is preferably 180 to 300° C., and more preferably 200 to 280° C. A cooling roll temperature is preferably 0 to 120° C., and more preferably 10 to 100° C.

The primary film or sheet obtained by extrusion may be further stretched by means of uniaxial stretching or biaxial stretching, or other means, thereby obtaining a stretch molded polyolefin stretched film. Examples of the stretching method include sequential biaxial stretching or simultaneous biaxial stretching by a tenter mode or simultaneous biaxial stretching by an inflation mode of the extruded film or sheet in a continuous manner. In addition, a batch-type biaxial stretching apparatus may also be used. Though a stretch ratio may be properly determined according to an application of the stretched film, it is preferred to undergo uniaxial stretching or biaxial stretching 2 to 12 times with respect to each of the machine direction (MD) and/or the direction (TD) perpendicular to the machine direction.

In general, it is known that in the case of undergoing sequential biaxial stretching, for example, in the case where the film is first oriented by means of stretching in the MD direction and then further stretched in the TD direction, if the stretch ratio in the MD direction is too high, on the occasion of increasing the stretch ratio in the TD direction, there is generated such a fault that the film is liable to be broken. In the case of using the polyolefin composition for stretched film of the present invention, good stretchability is obtained, and hence, it also becomes possible to undergo molding in a high stretch ratio. For example, after setting an appropriate stretching temperature, it is possible to undergo stretching 5 times or more, and moreover 5.5 times or more in the MD direction. In addition, after stretching in the MD direction, it is also possible to undergo stretching 9 times or more, and moreover 9.5 times or more in the TD direction.

In the sequential biaxial stretching by a tenter mode, this primary film is reheated at a temperature suitable for stretching (longitudinal (TD) stretching temperature: preferably 70 to 180° C., and more preferably 80 to 170° C.) and stretched between a slow (front) roll and a fast (rear) roll in the machine direction (MD). Subsequently, the film comes into a tenter portion and further heated (lateral (MID) stretching temperature: preferably 140 to 175° C., and more preferably 145 to 170° C.) while holding the both ends of the film stretched in the MD direction, whereby it is stretched in the direction (TD) perpendicular to the machine direction. Finally, the film after the stretching treatment is heat treated (heat fixing temperature: preferably 140 to 175° C., and more preferably 145 to 170° C.) to stabilize film physical properties, followed by winding up by a winding up machine. The resulting stretched film may be further adjusted to an appropriate width or length by a machine, such as a slitter, etc., thereby forming it in a shape according to the purpose. In addition, it is also possible to obtain the polyolefin stretched film of the present invention by adopting a stretching mode by a biaxial simultaneous tenter mode for simultaneously undergoing stretching in the machine direction (MD) and the perpendicular direction (TD) as described above.

It may be supposed that the polyolefin composition for stretched film of the present invention may reveal beneficial effects for, in addition to the production method of a stretched film, any of molding methods including a stretching process, in particular, molding methods in which after the film is once solidified, it is reheated and stretched (e.g., blow molding inclusive of extrusion processing blow molding or injection blow molding, heat molding, etc.). For example, in the case of using the polyolefin composition for stretched film of the present invention by means of blow molding adopted on the occasion of molding a bottle, the bottle thickness is small in unevenness (scattering) and uniform due to excellent stretchability, and hence, a lowering of unevenness of the quality, such as bottle strength, etc., is inhibited, and the transparency is also improved. Thus, it is also possible to apply the polyolefin composition for stretched film of the present invention to a polypropylene-based injection stretching blow bottle in place of a polyethylene terephthalate (PET) bottle.

The stretch ratio is generally 4 to 50 times in terms of a planar ratio obtained by multiplying the machine direction (MD) and/or the direction (TD) perpendicular to the machine direction. However, when the polyolefin composition for stretched film of the present invention is used, the stretchability is more improved, and hence, it becomes possible to attain a planar ratio more than this, for example, 50.5 times or more, and moreover 52 times or more. Nevertheless the film stretched in a high stretch ratio in this way is thin, it is excellent in rigidity and transparency, and it is possible to suppress shrinkage of the film after stretching.

In general, it is known that when the stretching temperature on the occasion of producing a stretched film is a low temperature, the resulting stretched film is more excellent in mechanical properties and optical properties than a stretched film stretched in a high-temperature region. According to the polyolefin stretched film of the present invention, a stretchable temperature width thereof is expanded in a lower temperature range; and even in a film molded under a severe molding condition under which when using a conventional polypropylene raw material, uneven thickness is generated, and breakage of the film originated therefrom occurs, thereby making it impossible to undergo stretching, while maintaining stable stretch molding, excellent mechanical properties, such as elastic modulus, breaking strength, breaking elongation, etc., are revealed, as well as excellent optical properties, such as transparency, gloss, etc., are revealed.

In the production method of the polyolefin stretched film in the present invention, the production method of the polypropylene stretched film is a production method in which the propylene-based polymer (A') (in particular, polypropylene with low stereoregularity) is added in an amount of 0.5% by mass or more and less than 17% by mass relative to a total content of the olefin-based polymer (B) and the propylene-based polymer (A') and molded. Meanwhile, since the propylene-based polymer (A') (in particular, polypropylene with low stereoregularity) has a narrow composition and a narrow molecular weight distribution, it may be treated as a pellet even at room temperature. In consequence, even by dry blending the propylene-based polymer (A') in the olefin-based polymer (B), it is possible to undergo molding of a film.

Furthermore, the production method of a stretched film in the present invention is a production method of a stretched film of continuously stretching a film composed of a polyolefin composition for stretched film in a machine direction (MD) and subsequently continuously stretching the film in a direction (TD) perpendicular to the machine direction.

For the production method of a stretched film, a continuous molding apparatus available from, for example, Bruckner, JSW, Mitsubishi Heavy Industries, Ltd., Andritz, or the like, is used. According to this apparatus, the polyolefin composition for stretched film is extruded from a screw-type extruder; the extrudate is continuously stretched in a machine direction (MD) in a longitudinal stretching process combining a low-speed roll and a high-speed roll while preheating on a line; the longitudinally stretched film is further preheated while running; and in a state of holding both ends of the longitudinally stretched film along the longitudinal direction of the longitudinally stretched film, the film is continuously laterally stretched in a direction (TD) perpendicular to the machine direction while running on a heated wide line, whereby a stretched film stretched in the machine direction (MD) and the direction (TD) perpendicular to the machine direction may be continuously produced by one line.

Though the polyolefin stretched film of the present invention is not particularly limited, it can be used for wide applications, for example, packaging materials of a food application, an industrial application, or the like, electric materials, such as, condensers or capacitors, etc., fibers, stationeries, plastic components, various reusable containers, experimental instruments, speaker corns, automobile components, paper moneys, and the like.

EXAMPLES

Production examples of propylene-based polymers (A'-1) and (A'-2) which were used in Examples are hereunder described.

Production Example 1 [Production of Propylene-Based Polymer (A'-1)]

In a stirrer-equipped stainless steel-made reactor having an internal volume of 20 L, 20 L/hr of n-heptane and 15 mmol/hr of triisobutylaluminum, and further, a catalyst component obtained by previously bringing dimethylanilinium tetrakispentafluorophenylborate, (1,2'-dimethylsilylene)(2,1'-dimethylsilylene)-bis(3-trimethylsilylmethylindenyl)zirconium dichloride, triisobutylaluminum, and propylene into contact with each other in a mass ratio of 1/2/20 in an amount of 6 µmol/hr as converted into zirconium were continuously fed.

A polymerization temperature was set to 55° C., and propylene and hydrogen were continuously fed such that a hydrogen concentration in a gas phase portion of the reactor was kept at 8 mol %, and a whole pressure within the reactor was kept at 1.0 MPa·G, thereby undergoing a polymerization reaction.

To the resulting polymerization solution, IRGANOX 1010 (available from BASF SE) as a stabilizer was added in a content proportion of 1,000 ppm by mass, and subsequently, the n-heptane as the solvent was removed, thereby obtaining a propylene-based polymer (A'-1) of low crystalline polypropylene.

Production Example 2 [Production of Propylene-Based Polymer (A'-2)]

In a stirrer-equipped stainless steel-made reactor having an internal volume of 20 L, 20 L/hr of n-heptane and 15 mmol/hr of triisobutylaluminum, and further, a catalyst component obtained by previously bringing dimethylanilinium tetrakispentafluorophenylborate, (1,2'-dimethylsilylene)(2,1'-dimethylsilylene)-bis(3-trimethylsilylmethylindenyl)zirconium dichloride, triisobutylaluminum, and propylene into contact with each other in a mass ratio of 1/2/20 in an amount of 6 µmol/hr as converted into zirconium were continuously fed.

A polymerization temperature was set to 58° C., and propylene and hydrogen were continuously fed such that a hydrogen partial pressure in a gas phase portion of the reactor was kept at 50 kPa, and a whole pressure within the reactor was kept at 1.0 MPa·G, thereby undergoing a polymerization reaction.

To the resulting polymerization solution, IRGANOX 1010 (available from BASF SE) as a stabilizer was added in a content proportion of 500 ppm by mass, and subsequently, the n-heptane as the solvent was removed, thereby obtaining a propylene-based polymer (A'-2) of low crystalline polypropylene.

With respect to the propylene-based polymers (A'-1) and (A'-2) obtained in Production Examples 1 and 2, respectively, the following measurements were carried out. The measurement results are shown in Table 1.

[DSC Measurement]

A melting endotherm obtained from a melting endothermic curve obtained by holding 10 mg of a sample at −10° C. for 5 minutes in a nitrogen atmosphere and then increasing the temperature at a rate of 10° C./min with a differential scanning calorimeter (DSC-7, available from Perkin Elmer, Inc.) was determined as a melting endotherm (ΔH-D). In addition, a melting point (Tm-D) was determined from a peak top of a peak observed on the highest temperature side of the obtained melting endothermic curve.

An example of a graph of a melting endotherm and a temperature, as observed from the DSC measurement is shown in FIG. 1.

As shown in FIG. 1, the melting endotherm (ΔH-D) is calculated by defining a line connecting a point on a low-temperature side where no change of the quantity of heat is present with a point on a high-temperature side where no change of the quantity of heat is present as base line and determining an area surrounded by a line portion containing a peak of a melting endothermic curved obtained by the DSC measurement with a differential scanning calorimeter (DSC-7, available from Perkin Elmer, Inc.) and the foregoing base line.

[NMR Measurement]

The $^{13}$C-NMR spectrum was measured with the following device under the following conditions according to the peak assignment proposed by A. Zambelli, et al., "Macromolecules, vol. 8, p. 687 (1975)".

Device: $^{13}$C-NMR device, JNM-EX400 series, manufactured by JEOL, Ltd.
Method: Proton complete decoupling method
Concentration: 220 mg/mL
Solvent: Mixed solvent of 1,2,4-trichlorobenzene and deuterated benzene in a ratio of 90/10 (volume ratio)
Temperature: 130° C.
Pulse width: 45°
Pulse repetition time: 4 seconds
Accumulation: 10,000 times <Calculating Expressions>

$$M=m/S\times100$$

$$R=\gamma/S\times100$$

$$S=P\beta\beta+P\alpha\beta+P\alpha\gamma$$

S: Signal intensity of carbon atoms in side chain methyl of all the propylene units
Pββ: 19.8 to 22.5 ppm Pαβ: 18.0 to 17.5 ppm
Pαγ: 17.5 to 17.1 ppm
γ: Racemic pentad chain, 20.7 to 20.3 ppm
m: Mesopentad chain, 21.7 to 22.5 ppm The mesopentad fraction [mmmm], the racemic pentad fraction [rrrr], and the racemic-meso-racemic-meso pentad fraction [rmrm] are measured in conformity with the method proposed by A. Zambelli, et al., "Macromolecules, 6, 925 (1973)" and are a meso fraction, a racemic fraction, and a racemic-meso-racemic-meso fraction, respectively in the pentad units of the polypropylene molecular chain that are measured based on a signal of the methyl group in the $^{13}$C-NMR spectrum. As the mesopentad fraction [mmmm] increases, the stereoregularity increases, too. In addition, the triad fractions [mm], [rr], and [mr] were also calculated by the above-described method.

[Measurement of Weight Average Molecular Weight (Mw) and Molecular Weight Distribution (Mw/Mn)]

The weight average molecular weight (Mw) and the molecular weight distribution (Mw/Mn) were determined by means of the gel permeation chromatography (GPC) method. For the measurement, the following device and conditions were used to obtain a weight average molecular weight as converted into polystyrene.

<GPC Measuring Device>
Column: TOSO GMHHR-H(S)HT
Detector: RI detector for liquid chromatography, WATERS 150C manufactured by WATERS Corporation <Measurement Conditions>
Solvent: 1,2,4-trichlorobenzene
Measurement temperature: 145° C.
Flow rate: 1.0 mL/min
Sample concentration: 2.2 mg/mL
Injection amount: 160 μL
Calibration curve: Universal Calibration
Analysis program: HT-GPC (ver. 1.0)

[Measurement of Melt Flow Rate]

The melt flow rate was measured under conditions of a temperature of 230° C. and a load of 2.16 kg in conformity with JIS K7210.

D): 97 J/g) was extruded at 250° C. with a 50 φmm sheet molding machine, available from Thermo Plastics Industrial Co., Ltd., thereby preparing a single-layered film having a thickness of 1,000 μm. At this time, a temperature of a cooling roll was 50° C. A sheet of the resulting single-layered film was stretched in a machine direction (MD, longitudinal stretching) with a roll stretching machine, available from Iwamoto Seisakusho Co., Ltd. under conditions of a stretching temperature of 152° C. and a longitudinal stretch ratio of 5 times and subsequently stretched in a direction perpendicular to the machine direction (TD, lateral stretching) with a table tenter, available from Iwamoto Seisakusho Co., Ltd. at a stretching temperature of 164° C., 165° C., 166° C., 167° C., 168° C., and 169° C., respectively, thereby preparing a film, and a biaxially strength film having a thickness of 21 μm was prepared at a different stretching temperature under conditions of a preheating time of 68 seconds, a stretching rate of 6,500%/min, and a stretch ratio of 9.5 times at the respective times of lateral stretching. The evaluation of stretchability of the film was made by undergoing stretching 3 times or more under the same conditions, and while the case where neither breakage nor stretching unevenness was observed was defined as a success, the stretchability was evaluated in terms of a proportion of a number of times of the success in the total number of times of stretching. As for the evaluation criteria, A means that a probability of success of stretching is 75% or more; B means that a probability of success of stretching is less than 75% and 25% or more; and C means that a probability of success of stretching is less than 25% or impossible stretching. In addition, the impossible stretching is corresponding to the case where breakage or thickness unevenness or undrawn portion in the appearance was confirmed. The results are shown in Table 2.

The thickness of the film was measured with a thickness distribution measuring instrument (available from Marl, "Millimar C1216"). As for the measurement range, two points at intervals of 5 cm in the MD direction of the film and four points at intervals of 5 cm in the TD direction were measured. A value obtained by calculating an average value from the resulting measured values was defined as the film thickness.

TABLE 1

|  | Production Example 1 Propylene-based polymer (A'-1) | Production Example 2 Propylene-based polymer (A'-2) |
| --- | --- | --- |
| Melting point (Tm-D) (° C.) | 75 | 74 |
| Melting endotherm (ΔH-D) (J/g) | 37 | 39 |
| [mmmm] (mol %) | 50.3 | 50.4 |
| [rrrr]/(1 − [mmmm]) | 0.038 | 0.028 |
| [rmrm] (mol%) | 2.9 | 2.5 |
| [mm] × [rr]/[mr]$^2$ | 1.6 | 1.6 |
| Weight average molecular weight (Mw) | 120000 | 250000 |
| Molecular weight distribution/Mw/Mn) | 2.0 | 2.0 |
| MFR (g/10 min) | 46 | 7 |

<Stretchability Evaluation (1)>

The stretchability evaluation regarding a stretchable temperature width was carried out in the following manner.

Example 1

A dry blend of a resin composition composed of 3% by mass of the propylene-based polymer (A'-1) of Production Example 1 and 97% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-

Example 2

A dry blend of a resin composition composed of 5% by mass of the propylene-based polymer (A'-1) of Production Example 1 and 95% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-

D): 97 J/g) was molded into a stretched film by the same method as in Example 1, and the stretchability of the film was evaluated. The results are shown in Table 2.

Example 3

A dry blend of a resin composition composed of 7% by mass of the propylene-based polymer (A'-1) of Production Example 1 and 93% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, and the stretchability of the film was evaluated. The results are shown in Table 2.

Example 4

A dry blend of a resin composition composed of 5% by mass of the propylene-based polymer (A'-2) of Production Example 2 and 95% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, and the stretchability of the film was evaluated. The results are shown in Table 2.

Example 5

A dry blend of a resin composition composed of 5% by mass of the propylene-based polymer (A'-1) of Production Example 1 and 95% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretching temperature to 147° C., and the stretchability of the film was evaluated. The results are shown in Table 2.

Example 6

A dry blend of a resin composition composed of 5% by mass of the propylene-based polymer (A'-2) of Production Example 2 and 95% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretching temperature to 147° C., and the stretchability of the film was evaluated. The results are shown in Table 2.

Example 7

A dry blend of a resin composition composed of 5% by mass of the propylene-based polymer (A'-1) of Production Example 1 and 95% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretch ratio to 5.5 times, and the stretchability of the film was evaluated. The results are shown in Table 2.

Example 8

A dry blend of a resin composition composed of 5% by mass of the propylene-based polymer (A'-2) of Production Example 2 and 95% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretch ratio to 5.5 times, and the stretchability of the film was evaluated. The results are shown in Table 2.

Example 9

A dry blend of a resin composition composed of 5% by mass of the propylene-based polymer (A'-2) of Production Example 2 and 95% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretch ratio to 6 times, and the stretchability of the film was evaluated. The results are shown in Table 2.

Comparative Example 1

A resin composition composed of only a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, and the stretchability of the film was evaluated. The results are shown in Table 2.

Comparative Example 2

A resin composition composed of only a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretching temperature to 147° C., and the stretchability of the film was evaluated. The results are shown in Table 2.

Comparative Example 3

A resin composition composed of only a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretch ratio to 5.5 times, and the stretchability of the film was evaluated. The results are shown in Table 2.

Comparative Example 4

A resin composition composed of only a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) was molded into a stretched film by the same method as in Example 1, except for setting the longitudinal stretch ratio to 6 times, and the stretchability of the film was evaluated. The results are shown in Table 2.

TABLE 2

| | Propylene-based polymer (A') | | Melting endotherm of composition (J/g) | Stretching temperature in machine direction (MD) (° C.) | Stretch ratio in machine direction (MD) (times) | Stretching temperature in transverse direction (TD) (° C.) | | | | | |
|---|---|---|---|---|---|---|---|---|---|---|---|
| | Kind | Blending amount (% by mass) | | | | 164 | 165 | 166 | 167 | 168 | 169 |
| Example 1 | Propylene-based polymer (A'-1) | 3 | 94 | 152 | 5 | C | A | A | A | A | A |
| Example 2 | Propylene-based polymer (A'-1) | 5 | 91 | 152 | 5 | A | A | A | A | A | A |
| Example 3 | Propylene-based polymer (A'-1) | 7 | 90 | 152 | 5 | A | A | A | A | A | A |
| Example 4 | Propylene-based polymer (A'-2) | 5 | 91 | 152 | 5 | A | A | A | A | A | A |
| Comparative Example 1 | None | 0 | 97 | 152 | 5 | C | C | A | A | A | A |
| Example 5 | Propylene-based polymer (A'-1) | 5 | 91 | 147 | 5 | B | A | A | A | A | A |
| Example 6 | Propylene-based polymer (A'-2) | 5 | 91 | 147 | 5 | A | A | A | A | A | A |
| Comparative Example 2 | None | 0 | 97 | 147 | 5 | C | C | A | A | A | A |
| Example 7 | Propylene-based polymer (A'-1) | 5 | 91 | 152 | 5.5 | C | A | A | A | A | A |
| Example 8 | Propylene-based polymer (A'-2) | 5 | 91 | 152 | 5.5 | A | A | A | A | A | A |
| Comparative Example 3 | None | 0 | 97 | 152 | 5.5 | C | C | C | B | B | B |
| Example 9 | Propylene-based polymer (A'-2) | 5 | 91 | 152 | 6 | C | C | B | A | A | C |
| Comparative Example 4 | None | 0 | 97 | 152 | 6 | C | C | C | C | C | C |

As is clear from Table 2, from comparison of Examples 1 to 4 with Comparative Example 1 and comparison of Examples 5 to 6 with Comparative Example 2, it is understood that by blending the propylene-based polymer (A'), the stretchable temperature region is expanded in a wide stretchable temperature region, particularly a lower temperature region, as compared with the case of not blending the propylene-based polymer (A'). In view of the fact that the stretchable temperature region is expanded, it becomes possible to undergo high-speed molding at the time of molding, and it also becomes possible to reduce the production cost, as compared with the conventional polypropylene raw material.

In particular, from comparison of Examples 7 and 8 with Comparative Example 3, or comparison of Example 9 with Comparative Example 4, by adding the propylene-based polymer (A') that is polypropylene with low stereoregularity, it is understood that it becomes possible to undergo stretching at a higher stretch ratio than that of a usual molding condition of biaxially stretched polypropylene film [stretch ratio in machine direction (MD): 5 times]×[stretch ratio in transverse direction (TD): 9.5 to 10 times].

<Stretchability Evaluation (2)>

Next, the stretching temperature and the stretch ratio were changed, and the mechanical properties and optical properties of each of the resulting films were evaluated.

[Measurement of Stretching Stress]

As for the measurement of a stretching stress, on the occasion of subjecting the film after MD stretching to TD stretching with a table tenter (available from Iwamoto Seisakusho Co., Ltd.), a stress detected at the time of changing a TD stretch ratio while holding the MD stretched film by a chuck was detected by a detector attached to the table tenter. A relation line (curve) was drawn on two-dimensional coordinate axes, in which the abscissa is a TD stretch ratio, and the ordinate is a detected stress, and a maximum value of a first inflection point of a relation line (first inflection point appearing on the occasion of changing the stretch ratio from a low stretch ratio to a high stretch ratio) was determined as a yield stretching stress. As the value of the yield stretching stress is small, it becomes possible to undergo uniform stretching, and excellent stretchability is revealed.

[Measurement of Mechanical Properties]

A strip-shaped test piece of 200 mm×15 mm was drawn at a tensile rate of 300 mm/min by using a tensile tester (available from Shimadzu Corporation, Autograph AG-I), thereby determining elastic modulus, breaking strength, and breaking elongation.

(i) Elastic Modulus

The elastic modulus at the time of drawing in a transverse direction (TD, lateral direction) was measured by using the tensile tester. As for the measurement condition, the strip-shaped test piece of 200 mm×15 mm was used and drawn by the tensile tester at a chuck-to-chuck distance of 150 mm and a tensile rate of 300 mm/min. A relation line (curve) was drawn on two-dimensional coordinate axes, in which the abscissa is an elongation (strain), and the ordinate is a stress, and an inclination of the relation line before the yield point was determined as the "elastic modulus". The higher the value of the elastic modulus, the more excellent the rigidity of the film is.

(ii) Breaking Strength

In the relation line (curve) on the two-dimensional coordinate axes as described above, a maximum tensile stress appearing on the test piece before the test piece was broken was determined as the "breaking strength".

(iii) Breaking Elongation

Breaking elongation (%)=100×(L−L_0)/L_0

In the expression, $L_0$ represents a length of the test piece before the test, and L represents a length of the test piece at the time of breakage.
[Measurement of Optical Properties]
(i) Measurement of Transparency The transparency was measured using an ISO haze meter (NDH2000), available from Nippon Denshoku Industries Co., Ltd. in conformity with JIS K7105 and JIS K7136. The smaller the haze value, the higher the transparency is.

Haze (%)=Td/Tt×100

In the expression, Td represents a diffuse transmittance, and Tt represents a total light transmittance.
(ii) Measurement of Gloss The gloss was measured using a gloss meter, "VG2000", available from Nippon Denshoku Industries Co., Ltd. in conformity with JIS K7105 and JIS Z8741. It is to be noted that a 60° specular gloss was measured. The higher the gloss value, the higher the glossiness is.

Example 10

With respect to the film sample of Example 2 as molded at a stretching temperature in a transverse direction (TD) (hereinafter referred to as "lateral stretching temperature) of 168° C., a yield stress as an indicator of stretchability, and elastic modulus, breaking strength, breaking elongation, haze, and gloss as film physical properties values were evaluated. The results are shown in Table 3.

Example 11

With respect to the film sample of Example 2 as molded at a lateral stretching temperature of 164° C., a yield stress as an indicator of stretchability, and elastic modulus, breaking strength, breaking elongation, haze, and gloss as film physical properties values were evaluated. The results are shown in Table 3.

Example 12

With respect to the film sample of Example 7 as molded at a lateral stretching temperature of 168° C., a yield stress as an indicator of stretchability, and elastic modulus, breaking strength, breaking elongation, haze, and gloss as film physical properties values were evaluated. The results are shown in Table 3.

Example 13

With respect to the film sample of Example 7 as molded at a lateral stretching temperature of 165° C., a yield stress as an indicator of stretchability, and elastic modulus, breaking strength, breaking elongation, haze, and gloss as film physical properties values were evaluated. The results are shown in Table 3.

Example 14

With respect to the film sample of Example 4 as molded at a lateral stretching temperature of 168° C., a yield stress as an indicator of stretchability, and elastic modulus, breaking strength, breaking elongation, haze, and gloss as film physical properties values were evaluated. The results are shown in Table 3.

Example 15

With respect to the film sample of Example 4 as molded at a lateral stretching temperature of 164° C., a yield stress as an indicator of stretchability, and elastic modulus, breaking strength, breaking elongation, haze, and gloss as film physical properties values were evaluated. The results are shown in Table 3.

Example 16

With respect to the film sample of Example 8 as molded at a lateral stretching temperature of 168° C., a yield stress as an indicator of stretchability, and elastic modulus, breaking strength, breaking elongation, haze, and gloss as film physical properties values were evaluated. The results are shown in Table 3.

Example 17

With respect to the film sample of Example 8 as molded at a lateral stretching temperature of 164° C., a yield stress as an indicator of stretchability, and elastic modulus, breaking strength, breaking elongation, haze, and gloss as film physical properties values were evaluated. The results are shown in Table 3.

Example 18

With respect to the film sample of Example 9 as molded at a lateral stretching temperature of 168° C., a yield stress as an indicator of stretchability, and elastic modulus, breaking strength, breaking elongation, haze, and gloss as film physical properties values were evaluated. The results are shown in Table 3.

Comparative Example 5

With respect to the film sample of Comparative Example 1 as molded at a lateral stretching temperature of 168° C., a yield stress as an indicator of stretchability, and elastic modulus, breaking strength, breaking elongation, haze, and gloss as film physical properties values were evaluated. The results are shown in Table 3.

Comparative Example 6

With respect to the film sample of Comparative Example 1 as molded at a lateral stretching temperature of 166° C., a yield stress as an indicator of stretchability, and elastic modulus, breaking strength, breaking elongation, haze, and gloss as film physical properties values were evaluated. The results are shown in Table 3.

Comparative Example 7

With respect to a film sample obtained by molding a stretched film by the same method as in Example 1, except for using only F-300SP, available from Prime Polymer Co., Ltd. (melting point: 163° C., tensile elastic modulus: 1,700 MPa, stereoregularity [mmmm]: 90%, melting endotherm (ΔH-D): 86 J/g) in place of the resin of Comparative Example 5, and molding it at a lateral stretching temperature of 165° C., a yield stress as an indicator of stretchability, and elastic modulus, breaking strength, breaking elongation, haze, and gloss as film physical properties values were evaluated. The results are shown in Table 3.

Comparative Example 8

With respect to a film sample obtained by molding a stretched film by the same method as in Example 1, except for using only F-300SP, available from Prime Polymer Co., Ltd. (melting point: 163° C., tensile elastic modulus: 1,700 MPa, stereoregularity [mmmm]: 90%, melting endotherm (ΔH-D): 86 J/g) in place of the resin of Comparative Example 5, and molding it at a lateral stretching temperature of 158° C., a yield stress as an indicator of stretchability, and elastic modulus, breaking strength, breaking elongation, haze, and gloss as film physical properties values were evaluated. The results are shown in Table 3.

Example 19

With respect to a stretched film sample molded by the same method as in Example 1, except for using a dry blend of a resin composition composed of 15% by mass of the propylene-based polymer (A'-1) of Production Example 1 and 85% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) and setting the lateral stretching temperature to 168° C., a yield stress as an indicator of stretchability, and elastic modulus, breaking strength, breaking elongation, haze, and gloss as film physical properties values were evaluated. The results are shown in Table 3.

Example 20

With respect to a stretched film sample molded by the same method as in Example 1, except for using a dry blend of a resin composition composed of 15% by mass of the propylene-based polymer (A'-1) of Production Example 1 and 85% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) and setting the lateral stretching temperature to 161° C., a yield stress as an indicator of stretchability, and elastic modulus, breaking strength, breaking elongation, haze, and gloss as film physical properties values were evaluated. The results are shown in Table 3.

Example 21

With respect to a stretched film sample molded by the same method as in Example 1, except for using a dry blend of a resin composition composed of 5% by mass of the propylene-based polymer (A'-1) of Production Example 1 and 95% by mass of a propylene-based polymer (B") (PP, available from Prime Polymer Co., Ltd., F-300SP, melting point: 163° C., tensile elastic modulus: 1,700 MPa, stereoregularity [mmmm]: 90%, melting endotherm (ΔH-D): 86 J/g) and setting the lateral stretching temperature to 164° C., a yield stress as an indicator of stretchability, and elastic modulus, breaking strength, breaking elongation, haze, and gloss as film physical properties values were evaluated. The results are shown in Table 3.

Example 22

With respect to a stretched film sample molded by the same method as in Example 1, except for using a dry blend of a resin composition composed of 5% by mass of the propylene-based polymer (A'-1) of Production Example 1 and 95% by mass of a propylene-based polymer (B") (PP, available from Prime Polymer Co., Ltd., F-300SP, melting point: 163° C., tensile elastic modulus: 1,700 MPa, stereoregularity [mmmm]: 90%, melting endotherm (ΔH-D): 86 J/g) and setting the lateral stretching temperature to 156° C., a yield stress as an indicator of stretchability, and elastic modulus, breaking strength, breaking elongation, haze, and gloss as film physical properties values were evaluated. The results are shown in Table 3.

Comparative Example 9

With respect to a stretched film sample molded by the same method as in Example 1, except for using a dry blend of a resin composition composed of 20% by mass of the propylene-based polymer (A'-1) of Production Example 1 and 80% by mass of a propylene-based polymer (B') (PP, available from Prime Polymer Co., Ltd., F133A, melting point: 168° C., tensile elastic modulus: 2,000 MPa, stereoregularity [mmmm]: 97%, melting endotherm (ΔH-D): 97 J/g) and setting the lateral stretching temperature to 168° C., a yield stress as an indicator of stretchability, and elastic modulus, breaking strength, breaking elongation, haze, and gloss as film physical properties values were evaluated. The results are shown in Table 3.

TABLE 3

| | Olefin-based polymer (A) | | Olefin-based polymer (B) | | Melting endotherm of composition (J/g) | Longitudinal stretch ratio (times) | Lateral stretch temperature (° C.) | Stretchability Yield stress (kgf) |
|---|---|---|---|---|---|---|---|---|
| | Kind | Blending amount (% by mass) | Kind | Blending amount (% by mass) | | | | |
| Example 10 | Production Example 1 | 5 | Propylene-based polymer (B') | 95 | 91 | 5 | 168 | 0.82 |
| Example 11 | Production Example 1 | 5 | Propylene-based polymer (B') | 95 | 91 | 5 | 164 | 1.68 |
| Example 12 | Production Example 1 | 5 | Propylene-based polymer (B') | 95 | 91 | 5.5 | 168 | 0.99 |
| Example 13 | Production Example 1 | 5 | Propylene-based polymer (B') | 95 | 91 | 5.5 | 165 | 1.50 |
| Example 14 | Production Example 2 | 5 | Propylene-based polymer (B') | 95 | 91 | 5 | 168 | 0.77 |
| Example 15 | Production Example 2 | 5 | Propylene-based polymer (B') | 95 | 91 | 5 | 164 | 1.61 |
| Example 16 | Production Example 2 | 5 | Propylene-based polymer (B') | 95 | 91 | 5.5 | 168 | 0.97 |

TABLE 3-continued

| | | | | | | | | |
|---|---|---|---|---|---|---|---|---|
| Example 17 | Production Example 2 | 5 | Propylene-based polymer (B') | 95 | 91 | 5.5 | 164 | 1.72 |
| Example 18 | Production Example 2 | 5 | Propylene-based polymer (B') | 95 | 91 | 6 | 168 | 0.99 |
| Example 19 | Production Example 1 | 15 | Propylene-based polymer (B') | 85 | 83 | 5 | 168 | 0.51 |
| Example 20 | Production Example 1 | 15 | Propylene-based polymer (B') | 85 | 83 | 5 | 161 | 1.74 |
| Example 21 | Production Example 1 | 5 | Propylene-based polymer (B'') | 85 | 83 | 5 | 164 | 0.60 |
| Example 22 | Production Example 1 | 5 | Propylene-based polymer (B'') | 85 | 83 | 5 | 156 | 1.93 |
| Comparative Example 5 | None | 0 | Propylene-based polymer (B') | 100 | 97 | 5 | 168 | 1.08 |
| Comparative Example 6 | None | 0 | Propylene-based polymer (B') | 100 | 97 | 5 | 166 | 1.56 |
| Comparative Example 7 | None | 0 | Propylene-based polymer (B'') | 100 | 86 | 5 | 165 | 0.61 |
| Comparative Example 8 | None | 0 | Propylene-based polymer (B'') | 100 | 86 | 5 | 158 | 1.79 |
| Comparative Example 9 | Production Example 1 | 20 | Propylene-based polymer (B') | 80 | 78 | 5 | 168 | 0.38 |

| | Mechanical properties (MD: longitudinal direction) | | | Mechanical properties (TD: longitudinal direction) | | | Optical properties | | |
|---|---|---|---|---|---|---|---|---|---|
| | Initial elastic modulus (MPa) | Breaking strength (MPa) | Breaking elongation (%) | Initial elastic modulus (MPa) | Breaking strength (MPa) | Breaking elongation (%) | Haze (%) | Gloss (chilled surface) (%) | Gloss (anti-chilled surface) (%) |
| Example 10 | 2709 | 119 | 110 | 4432 | 217 | 32 | 0.51 | 135 | 134 |
| Example 11 | 2724 | 118 | 96 | 5966 | 271 | 25 | 0.14 | 146 | 148 |
| Example 12 | 2848 | 132 | 86 | 4817 | 257 | 29 | 0.25 | 137 | 141 |
| Example 13 | 2838 | 128 | 83 | 5725 | 263 | 23 | 0.20 | 153 | 141 |
| Example 14 | 2747 | 117 | 108 | 4795 | 228 | 28 | 0.47 | 134 | 130 |
| Example 15 | 2843 | 108 | 81 | 5618 | 279 | 24 | 0.24 | 148 | 139 |
| Example 16 | 2774 | 135 | 99 | 4740 | 241 | 27 | 0.31 | 136 | 141 |
| Example 17 | 2887 | 127 | 83 | 5766 | 307 | 25 | 0.27 | 146 | 145 |
| Example 18 | 2967 | 143 | 86 | 5023 | 247 | 21 | 0.23 | 150 | 127 |
| Example 19 | 2318 | 118 | 102 | 3855 | 170 | 23 | 0.92 | 144 | 145 |
| Example 20 | 2600 | 123 | 69 | 5196 | 257 | 17 | 0.25 | 153 | 153 |
| Example 21 | 2269 | 117 | 93 | 3811 | 198 | 23 | 0.44 | 149 | 150 |
| Example 22 | 2427 | 118 | 85 | 5616 | 264 | 14 | 0.25 | 152 | 153 |
| Comparative Example 5 | 2998 | 119 | 97 | 5169 | 258 | 27 | 0.28 | 137 | 136 |
| Comparative Example 6 | 2967 | 121 | 91 | 6114 | 282 | 28 | 0.21 | 147 | 149 |
| Comparative Example 7 | 2278 | 115 | 112 | 3795 | 197 | 28 | 0.92 | 124 | 118 |
| Comparative Example 8 | 2273 | 112 | 88 | 4833 | 265 | 22 | 0.20 | 147 | 143 |
| Comparative Example 9 | 2015 | 103 | 99 | 3265 | 154 | 26 | 1.43 | 141 | 141 |

Propylene-based polymer (B'): F113A, available from Prime Polymer Co., Ltd.
Propylene-based polymer (B''): F-300SP, available from Prime Polymer Co., Ltd.

As is clear from Table 3, it is understood that with respect to the stretchability and film physical properties (namely, mechanical properties and optical properties) of Examples 10 to 18, a balance between the stretchability and the film physical properties is good as compared with Comparative Examples 5 to 8 in which the propylene-based polymer (A') that is polypropylene with low stereoregularity is not added.

In particular, in Examples 10, 11, 14, and 15, the materials in which the propylene-based polymer (A'-1) or (A'-2) is blended are stretched at the stretching temperature in the transverse direction (TD) of 168° C. and 164° C., respectively, and in all of these Examples, the film physical properties are good. On the other hand, in Comparative Examples 5 and 6 in which the propylene-based polymer (A') is not blended, in view of the fact that on the occasion of stretching at the stretching temperature in the transverse direction (TD) of 168° C. and 166° C., respectively, in Comparative Example 6 in which the film is stretched in a lower temperature region, the yield stress is high as compared with that in Comparative Example 5, it is understood that the stretchability is lowered. In addition, in Comparative Examples 7 and 8 in which the propylene-based polymer having a lower melting point than the propylene-based polymer used in Comparative Examples 5 and 6, it is understood that by changing the stretching temperature, a balance between the stretchability and the optical properties becomes worse.

Furthermore, from the results of Example 18, there were obtained the results that even under a molding condition under which the stretching is impossible in the case of not adding the propylene-based polymer (A') that is polypropylene with low stereoregularity (in particular, the case where the stretch ratio in the machine direction (MD) is high), the stretching becomes possible, and the film physical properties (namely, mechanical properties and optical properties) are remarkably excellent.

It is understood from the foregoing results that by using the polyolefin composition for stretched film in which the propylene-based polymer (A') that is polypropylene with low stereoregularity is added, the polypropylene stretched film having an excellent balance between the stretchability and the film physical properties is obtained.

In addition, from the results of Examples 19 and 20, it was understood that Examples 19 and 20 bring such an effect that even by increasing the blending amount of the propylene-based polymer (A'-1) that is polypropylene with low stereoregularity to 15% by mass, the stretchability is excellent, and the film physical properties (namely, mechanical properties and optical properties) are also excellent, as compared with Comparative Examples 7 and 8 in which the melting endotherm of the polyolefin composition closely resembles to that in Examples 19 and 20.

In addition, from the results of Examples 21 and 22, it was understood that even by using the relatively soft propylene-based polymer (B") (PP, available from Prime Polymer Co., Ltd., F-300SP, melting point: 163° C., tensile elastic modulus: 1,700 MPa, stereoregularity [mmmm]: 90%, melting endotherm ($\Delta$H-D): 86 J/g) in place of the propylene-based polymer (B') (PP, available from Prime Polymer Co., Ltd., F133A, melting point: 168° C., tensile elastic modulus: 2,000 MPa, stereoregularity [mmmm]: 97%, melting endotherm ($\Delta$H-D): 97 J/g), the stretchability is excellent, and the film physical properties (namely, mechanical properties and optical properties) are also excellent, as compared with Comparative Examples 7 and 8 in which the melting endotherm of the polyolefin composition closely resembles to that in Examples 21 and 22.

On the other hand, from the results of Comparative Example 9, it was understood that when the blending amount of the propylene-based polymer (A'-1) of Production Example 1 is increased to 20% by mass, the breaking strength in the transverse direction (TD, lateral direction) to the machine direction is lowered, and the haze is also lowered.

Example 23

A resin composition composed of 3% by mass of the propylene-based polymer (A'-1) of Production Example 1 and 97% by mass of a propylene-based polymer (C') (PP, available from Korea Petro Chemical Ind. Co., Ltd., 5014L HPT-1, melting point: 166° C.) was extruded with a Bruckner's continuous molding pilot machine (extruder screw diameter: 120 mm$\phi$, extruder screw rotation number: 21 rpm, tenter line speed: 80 n/min, T-die width: 280 mm, chill roll diameter: 1,500 mm$\phi$) and cooled by a chill roll, thereby preparing a single-layered film. At this time, a chill roll temperature was 80° C., and water was not circulated in a raw water cooling tank. The prepared single-layered film was subsequently preheated by a preheating roll and then subjected to stretching (MD, longitudinal stretching) in a machine direction under conditions of a stretching temperature of 135° C. and a stretch ratio of 4.5 times. Furthermore, the film was allowed to pass through a tenter in such a state that the both ends of the film were fixed by a chuck and subjected to stretching in a direction perpendicular to the machine direction (TD, lateral stretching) under conditions of a stretching temperature of 150° C., stretch ratio of 7.3 times, and a heat fixing temperature of 140° C., thereby preparing a biaxially stretched film. The stretchability of the film was evaluated in terms of a number of times of breakage of the film within the tenter during continuous molding for a fixed time. Specifically, the case where the number of times of breakage for 10 minutes was 0 was defined as a breakage frequency: A; the case where the number of times of breakage for 10 minutes was 1 to 2 was defined as a breakage frequency: B; and the case where the number of times of breakage for 10 minutes was 3 or more was defined as a breakage frequency: C. With respect to the prepared film, its thickness was measured, and elastic modulus, breaking strength, breaking elongation, haze, and gloss were evaluated as film physical properties values. The results are shown in Table 4.

Example 24

On the occasion of forming a film by setting the longitudinal stretch ratio in the machine direction (MD) of Example 23 to 5.5 times, breakage frequency as well as elastic modulus, breaking strength, breaking elongation, haze, and gloss were evaluated as film physical properties values. The results are shown in Table 4.

Example 25

On the occasion of forming a film by setting the line speed in the machine direction (MD) of Example 23 to 96 m/min, breakage frequency as well as elastic modulus, breaking strength, breaking elongation, haze, and gloss were evaluated as film physical properties values. The results are shown in Table 4.

Example 26

On the occasion of forming a film by setting the line speed in the machine direction (MD) of Example 23 to 112 m/min, breakage frequency as well as elastic modulus, breaking strength, breaking elongation, haze, and gloss were evaluated as film physical properties values. The results are shown in Table 4.

Comparative Example 10

On the occasion of forming a film by using a resin composition composed of only a propylene-based polymer (C') (PP, available from Korea Petro Chemical Ind. Co., Ltd., 5014L HPT-1, melting point: 166° C.) by the same method as in Example 23, breakage frequency as well as elastic modulus, breaking strength, breaking elongation, haze, and gloss were evaluated as film physical properties values. The results are shown in Table 4.

Comparative Example 11

On the occasion of forming a film by using a resin composition composed of only a propylene-based polymer (C') (PP, available from Korea Petro Chemical Ind. Co., Ltd., 5014L HPT-1, melting point: 166° C.) by the same method as in Example 24, breakage frequency as well as elastic modulus, breaking strength, breaking elongation, haze, and gloss were evaluated as film physical properties values. The results are shown in Table 4.

The aforementioned 5014L HPT-1, available from Korea Petro Chemical Ind. Co., Ltd. are described below in detail.
PP name: 5014L HPT-1
Manufacturer: Korea Petro Chemical Ind. Co., Ltd.
Melting point (Tm-D): 166° C.
Tensile elastic modulus: 1,900 MPa
Stereoregularity [mmmm]: 97%
Melting endotherm ($\Delta$H-D): 95 J/g

TABLE 4

|  |  | Example 23 | Example 24 | Example 25 | Example 26 | Comparative Example 10 | Comparative Example 11 |
|---|---|---|---|---|---|---|---|
| Blending amount of propylene-based polymer (C') | % by mass | 97 | 97 | 97 | 97 | 100 | 100 |
| Blending amount of propylene-based polymer (A'-1) |  | 3 | 3 | 3 | 3 | 0 | 0 |
| Longitudinal stretch ratio | % | 450 | 550 | 450 | 450 | 450 | 550 |
| Line speed | m/min | 80 | 80 | 96 | 112 | 80 | 80 |
| Breakage frequency |  | A | A | A | A | B | C |
| Thickness | μm | 9.0 | 9.1 | 7.5 | 6.8 | 8.9 | 8.7 |
| Haze | % | 2.6 | 1.2 | 1.6 | 1.7 | 1.6 | 1.3 |
| Gloss | % | 117 | 136 | 130 | 130 | 127 | 132 |
| Elastic modulus MD | MPa | 2337 | 2794 | 2489 | 2437 | 2687 | 2700 |
| Breaking strength |  | 127 | 145 | 131 | 116 | 127 | 142 |
| Breaking elongation | % | 99 | 66 | 84 | 72 | 93 | 72 |
| Elastic modulus TD | MPa | 3938 | 4153 | 3610 | 4210 | 4694 | 4374 |
| Breaking strength |  | 191 | 205 | 190 | 164 | 198 | 213 |
| Breaking elongation | % | 20 | 22 | 23 | 14 | 16 | 22 |

As is clear from Table 4, in Examples 23 to 26, even when the longitudinal stretch ratio and the line speed that are a cause of deteriorating the stretchability are improved, the breakage frequency is not deteriorated, and the film physical properties exhibit good values. It is understood that by containing the propylene-based polymer (A'-1), even if the thickness of the film becomes thin, the breakage is inhibited by an improvement of the longitudinal stretch ratio or an improvement of the line speed. On the other hand, in Comparative Examples 10 to 11, in view of the fact that the breakage frequency is deteriorated in the same molding conditions as in Examples 23 to 26, it is understood that it is impossible to make the film thin while inhibiting the breakage frequency by an improvement of the longitudinal stretch ratio or an improvement of the line speed.

INDUSTRIAL APPLICABILITY

The polyolefin composition for stretched film of the present invention is able to be stretched in a lower temperature region and is excellent in mechanical properties and optical properties after stretching. Thus, the polyolefin composition for stretched film of the present invention can be used for wide applications, for example, packaging materials of a food application, an industrial application, or the like, electric materials, such as, condensers or capacitors, etc., fibers, stationeries, plastic components, various reusable containers, experimental instruments, speaker corns, automobile components, paper moneys, and the like.

The invention claimed is:
1. A polyolefin composition, comprising:
an olefin-based polymer (A) having a melting endotherm (ΔH-D), as obtained from a melting endothermic curve which is obtained under a measurement condition of holding a sample at −10° C. for 5 minutes in a nitrogen atmosphere and then increasing the temperature at a rate of 10° C./min with a differential scanning calorimeter (DSC), of 0 to 80 J/g; and
an olefin-based polymer (B) having a melting endotherm (ΔH-D), as observed under the foregoing measurement condition, of more than 80 J/g,
wherein a content of the olefin-based polymer (A) is 0.5% by mass or more and less than 17% by mass relative to a total content of the olefin-based polymer (A) and the olefin-based polymer (B), and
the polyolefin composition has a melting endotherm (ΔH-D), as observed under the foregoing measurement condition, of 80 to 120 J/g.
2. The polyolefin composition according to claim 1, wherein the olefin-based polymer (B) is a propylene-based polymer.
3. The polyolefin composition according to claim 1, wherein the olefin-based polymer (A) is a propylene-based polymer.
4. The polyolefin composition according to claim 1, wherein the olefin-based polymer (A) is a propylene-based polymer satisfying the following (1) and (2):
(1) [mmmm] is 20 to 60 mol %, and
(2) a melting point (Tm-D), as defined as a peak top observed on the highest temperature side of a melting endothermic curve which is obtained under a measurement condition of holding a sample at −10° C. for 5 minutes in a nitrogen atmosphere and then increasing the temperature at a rate of 10° C./min with a differential scanning calorimeter (DSC), is from 0 to 120° C.
5. The polyolefin composition according to claim 4, wherein the olefin-based polymer (A) further satisfies the following (3) and (4):

$$[rrrr]/(1-[mmmm]) \leq 0.1, \tag{3 and}$$

$$\text{molecular weight distribution}(Mw/Mn) < 4.0. \tag{4}$$

6. The polyolefin composition according to claim 4, wherein the olefin-based polymer (A) further satisfies the following (5) and (6):

$$[rmrm] > 2.5 \text{ mol \%}, \tag{5 and}$$

$$[mm] \times [rr]/[mr]^2 \leq 2.0. \tag{6}$$

7. The polyolefin composition according to claim 1, wherein the polyolefin composition is a polypropylene composition.
8. A polyolefin stretched film comprising the polyolefin composition according to claim 1 in at least one layer and being oriented in at least one direction.
9. A method for producing a polyolefin stretched film, which comprises:
heating a sheet comprising one or more layers comprising a polyolefin composition; and
simultaneously or sequentially stretching the sheet in a uniaxial direction or biaxial directions, wherein the polyolefin composition comprises:

an olefin-based polymer (A) having a melting endotherm (ΔH-D), as obtained from a melting endothermic curve which is obtained under a measurement condition of holding a sample at −10° C. for 5 minutes in a nitrogen atmosphere and then increasing the temperature at a rate of 10° C./min with a differential scanning calorimeter (DSC), of 0 to 80 J/g; and an olefin-based polymer (B) having a melting endotherm (ΔH-D), as observed under the foregoing measurement condition, of more than 80 J/g, wherein a content of the olefin-based polymer (A) is 0.5% by mass or more and less than 17% by mass relative to a total content of the olefin-based polymer (A) and the olefin-based polymer (B), and the polyolefin composition has a melting endotherm (ΔH-D), as observed under the foregoing measurement condition, of 80 to 120 J/g.

10. The method according to claim 9, wherein the polyolefin stretched film is a polypropylene stretched film.

11. A method for producing a stretched film, which comprises:

continuously stretching a film comprising a polyolefin composition in a machine direction (MD); and subsequently continuously stretching the film in a direction (TD) perpendicular to the machine direction, wherein the polyolefin composition comprises:

an olefin-based polymer (A) having a melting endotherm (ΔH-D), as obtained from a melting endothermic curve which is obtained under a measurement condition of holding a sample at −10° C. for 5 minutes in a nitrogen atmosphere and then increasing the temperature at a rate of 10° C./min with a differential scanning calorimeter (DSC), of 0 to 80 J/g; and an olefin-based polymer (B) having a melting endotherm (ΔH-D), as observed under the foregoing measurement condition, of more than 80 J/g, wherein a content of the olefin-based polymer (A) is 0.5% by mass or more and less than 17% by mass relative to a total content of the olefin-based polymer (A) and the olefin-based polymer (B), and the polyolefin composition has a melting endotherm (ΔH-D), as observed under the foregoing measurement condition, of 80 to 120 J/g.

* * * * *